J. P. MANSON.
POTATO VINE ARRANGER.
APPLICATION FILED MAY 31, 1911.
1,030,475.
Patented June 25, 1912.
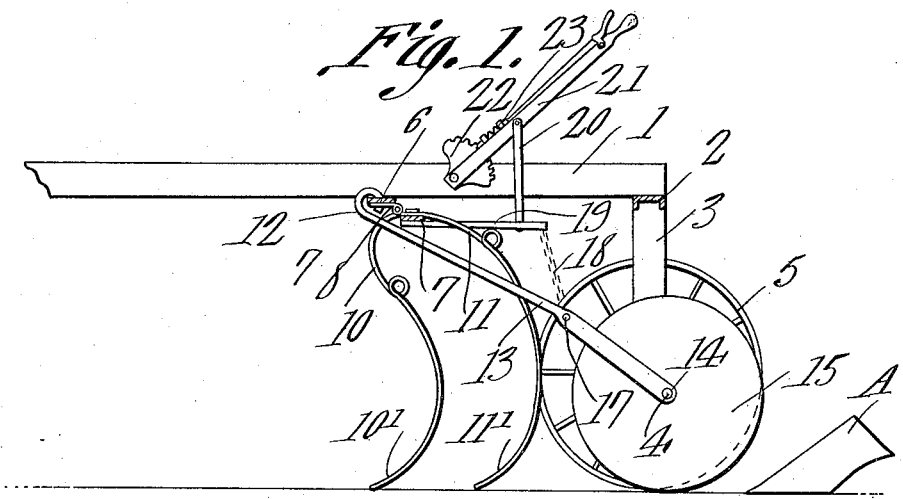
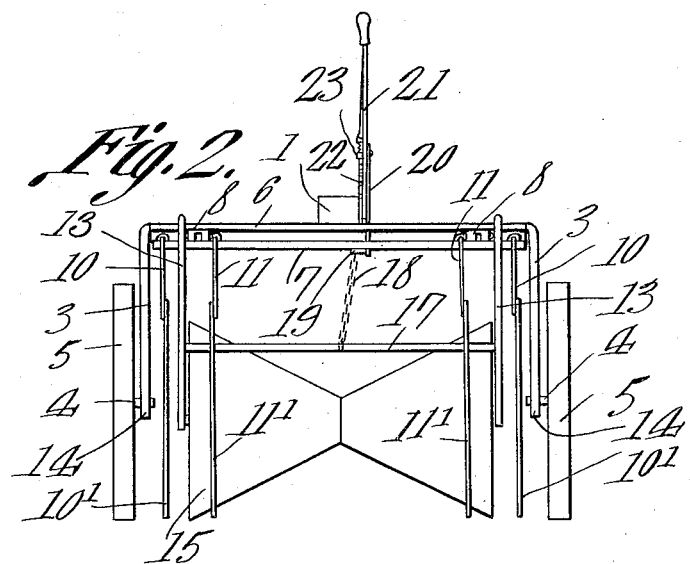
J. P. Manson,
Inventor
Witnesses
by C. A. Snow & Co.,
Attorneys

UNITED STATES PATENT OFFICE.

JOSEPH P. MANSON, OF HARTLAND, MAINE.

POTATO-VINE ARRANGER.

1,030,475.  Specification of Letters Patent. Patented June 25, 1912.

Application filed May 31, 1911. Serial No. 630,357.

*To all whom it may concern:*

Be it known that I, JOSEPH P. MANSON, a citizen of the United States, residing at Hartland, in the county of Somerset and State of Maine, have invented a new and useful Potato-Vine Arranger, of which the following is a specification.

This invention relates to improvements in potato vine arranging devices, and the primary object of the invention is the provision of a device adapted to be carried in front of, or in the path of travel of, a potato harvester or digger, and so arranged as to collect the vines to be readily gathered by the harvester or digger without clogging the conveyer mechanism thereof.

A further object of the invention is the provision of a device adapted to be used separately to arrange potato vines for digging and harvesting or to be attached to the draft pole of a potato digger or harvester as an attachment to gather and pack the vine in front of the point or digger plow thereof.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed, without departing from the spirit of the invention.

In the drawings—Figure 1 is a vertical longitudinal sectional view through the potato arranging device. Fig. 2 is a front elevation thereof.

Referring to the drawings, the numeral 1 designates the tongue or pole of a digger or harvester, or of the vine arranging device, which carries at its rear end, the transverse beam 2 provided with the downwardly projecting arms or supports 3, in whose lower ends are mounted the short axles 4, carrying the wheels 5.

Secured to the under side of the pole 1 in front of the yoke 2—3 is a transverse bar 6, to which is hingedly secured another transverse bar 7 by means of the hinge connection 8, and carried by the transverse bar 7 are the two forward vine gathering spring actuated arms 10, whose terminals 10', are disposed forwardly of the device and are adapted to engage the tangled ends of the vines and move them toward the center of the hill or row, while to the rear of the vine gathering spring actuated arms 10 are a pair of vine gathering arms 11, which are provided with their vine engaging terminals 11' that are within the vine engaging arms 10' of the forward spring actuated arms 10, and thereby assist further in engaging and gathering the vines so as to move them toward the top of the hill.

Pivoted by means of the hooked ends 12 to the transverse bar 6 of the machine, are the two curved arms 13, whose rear ends are connected at 14 to the axle of the vine packing roller 15, which as clearly shown is provided with the two truncated conical portions, which constitute a spool shaped member, and provides a roller which straddles the hill of potatoes and vines, and as the spring actuated fingers 10 and 11 move the vines toward the top of the hill, the said peculiarly shaped roller 15 will crowd the vines down upon the hill and pack the same, so that when the digger plow A, digs or harvests the potatoes and vines, the said packed and crowded vines with the potatoes, will be properly led to the conveyer of the digger, not clogging the same as often happens on account of the vines being extended.

Connected rigidly to the arms 13 intermediate of their length, is a rod 17, which through the medium of the chain 18 or other flexible connection, which is connected to the rear end of the arm 19, whose forward end is fixed to the bar 7, the link 20 connecting said arm 19 to the actuating lever 21, will permit the said vine crowding roller 15 to be held in a raised or lowered position to be adjusted with relation to the wheels 5 and the ridge or high ground upon which it operates. In order to lock the lever 21 in the adjusted position, a rack 22 and handle operated pawl 23 are provided, thus the operator of the potato harvester or digger whose front seat is disposed at the rear of the bar 1, will be in the position to operate the lever 21 and thereby the spring actuated gathering fingers 10 and 11 and also the vine crowding roller 15. As the arm 19 is connected to the transverse bar 7, and the transverse bar 7 carries the spring gathering fingers 10 and 11, the manipulation of the actuating lever 21 will effect simultaneous operation or movement of the fingers 10 and 11 and the roller 15.

From the foregoing description taken in connection with the drawings, it is evident that by the use of this device, either carrying it separately in advance of the potato harvesting or digging machine, or coupled with the same, the vines, which are scattered or which will incline between the rows and thereby provide a means for clogging the harvester and digger, will be untangled. By this means the fingers 10 and 11 will gather or tend to straighten the straggling ends of the vines, that spread across the row and lead them to the top of the hill, where the roller 15 will pass thereover and pack the vines upon the hill, in such a way, that when the digger or harvester gathers the potatoes and vines, the said vines will be carried up upon the conveying device of the said digger or harvester, without clogging the machine.

What is claimed is:

1. A potato vine arranger having two series of spring actuated vine engaging fingers, and a weighted roller straddling the row in the rear of said fingers.

2. A potato vine arranger having two series of spring actuated vine engaging fingers, and a spool shaped roller mounted in the rear of said fingers adapted to straddle the row.

3. A potato vine arranger, having two series of spring actuated vine engaging fingers, a weighted roller straddling the row in the rear of said fingers, and means for raising and lowering said fingers and roller.

4. A potato vine arranger, having two series of spring actuated vine engaging fingers, a spool shaped weighted roller straddling the row in the rear of the fingers, and means for raising and lowering the said fingers and roller.

5. A potato vine arranger, having a wheeled yoke, a draft bar connected thereto, a frame pivotally connected to the draft bar, two series of vine gathering fingers carried by said bar, means for raising and lowering the same, and a weighted vine crowding roller mounted in the rear of and in the path of the vine gathering fingers.

6. A potato vine arranger, comprising a wheeled yoke, a pair of forward spring actuated vine gathering fingers, another pair of vine gathering fingers arranged within the first mentioned fingers and to the rear thereof, a vine crowding roller adapted to pack the vines gathered by said fingers, and means for simultaneously raising and lowering the fingers and said roller.

In testimony that I claim the foregoing as my own, I have hereto affixed my signature in the presence of two witnesses.

JOSEPH P. MANSON.

Witnesses:
G. M. LANCEY,
G. W. CUMMINGS.

Copies of this patent may be obtained for five cents each, by addressing the "Commissioner of Patents, Washington, D. C."